United States Patent
Alexandre et al.

[11] Patent Number: 6,094,541
[45] Date of Patent: Jul. 25, 2000

[54] SYSTEM AND METHOD FOR TRANSFERRING IMAGES ON AN IMAGE CONTENT OF A FIRST FORMAT TO A PHOTOSENSITIVE FILM OF A SECOND FORMAT

[75] Inventors: Bernard G. Alexandre, 38138 Les Cotes d'Arey, France; Keith A. Bolt, Victor; Thomas C. Merle, Rochester, both of N.Y.

[73] Assignee: Eastman Kodak Company, Rochester, N.Y.

[21] Appl. No.: 09/034,714

[22] Filed: Mar. 4, 1998

[51] Int. Cl.$^7$ .................................................. G03B 17/24
[52] U.S. Cl. ............................................................. 396/319
[58] Field of Search ................................... 396/311, 319, 396/310, 322, 1, 2, 3, 312; 353/25, 26 A, 27 A, 27 R, 21, 121, 122; 355/27–29, 40–43, 72, 75

[56] References Cited

U.S. PATENT DOCUMENTS

| | | |
|---|---|---|
| 3,322,029 | 5/1967 | Palmquist et al. . |
| 4,647,187 | 3/1987 | Zahn et al. . |
| 4,647,190 | 3/1987 | Nitsch et al. . |
| 4,686,580 | 8/1987 | Kato et al. . |
| 4,748,476 | 5/1988 | Nakao . |
| 4,931,863 | 6/1990 | Tokuda . |
| 5,006,886 | 4/1991 | Suzuki . |
| 5,031,773 | 7/1991 | Manico et al. . |
| 5,097,289 | 3/1992 | Lucht et al. . |
| 5,162,843 | 11/1992 | Clapp . |
| 5,191,406 | 3/1993 | Brandestini et al. . |
| 5,218,404 | 6/1993 | Yamamoto et al. . |
| 5,287,175 | 2/1994 | Fang . |
| 5,289,292 | 2/1994 | Osada et al. . |
| 5,376,978 | 12/1994 | Bae . |
| 5,420,700 | 5/1995 | Maeda et al. . |
| 5,453,846 | 9/1995 | Tsao et al. . |
| 5,461,492 | 10/1995 | Jones . |
| 5,477,311 | 12/1995 | Tilley . |
| 5,477,353 | 12/1995 | Yamasaki . |
| 5,486,895 | 1/1996 | Leidig et al. . |
| 5,515,138 | 5/1996 | Hasegawa et al. . |
| 5,751,399 | 5/1998 | McIntyre et al. ........................ 353/120 |
| 5,774,752 | 6/1998 | Patton et al. ............................ 396/312 |
| 5,913,088 | 6/1999 | Moghadam et al. ..................... 396/311 |
| 5,934,777 | 8/1999 | Patton et al. .............................. 353/25 |
| 5,949,524 | 9/1999 | Patton et al. .............................. 355/40 |

FOREIGN PATENT DOCUMENTS

| | | |
|---|---|---|
| 0 892 303 | 1/1999 | European Pat. Off. . |
| 2 286 944 | 8/1995 | United Kingdom . |

*Primary Examiner*—Russell Adams
*Attorney, Agent, or Firm*—Frank Pincelli

[57] ABSTRACT

The present invention relates to a system and method of transferring images from an image content of a first format to a photosensitive film of a second format. The image content of the first format can include photosensitive material such as an exposed roll of 35 mm film, a photographic print, a floppy disk, a compact disc, etc. With the system and method of the present invention, it is possible for a customer to take, for example, an existing negative and have it transferred onto an Advanced Photo System film format. Therefore, in the system and method of the present invention, original exposed film such as 35 mm, 110 film, etc., can be scanned to produce a digital record of the images. The record of the images can be sent to a digital film writer where a preferred format, for example, Advanced Photo System film, can be obtained. The Advanced Photo System film can then be placed in a thrust-type film cartridge. This permits the conversion of old film types into a preferred film format that can be easily used to interface with film viewing devices. This also permits the conversion of non-permanent storage of images to a permanent media with high storage capabilities such as Advanced Photo System film.

19 Claims, 3 Drawing Sheets

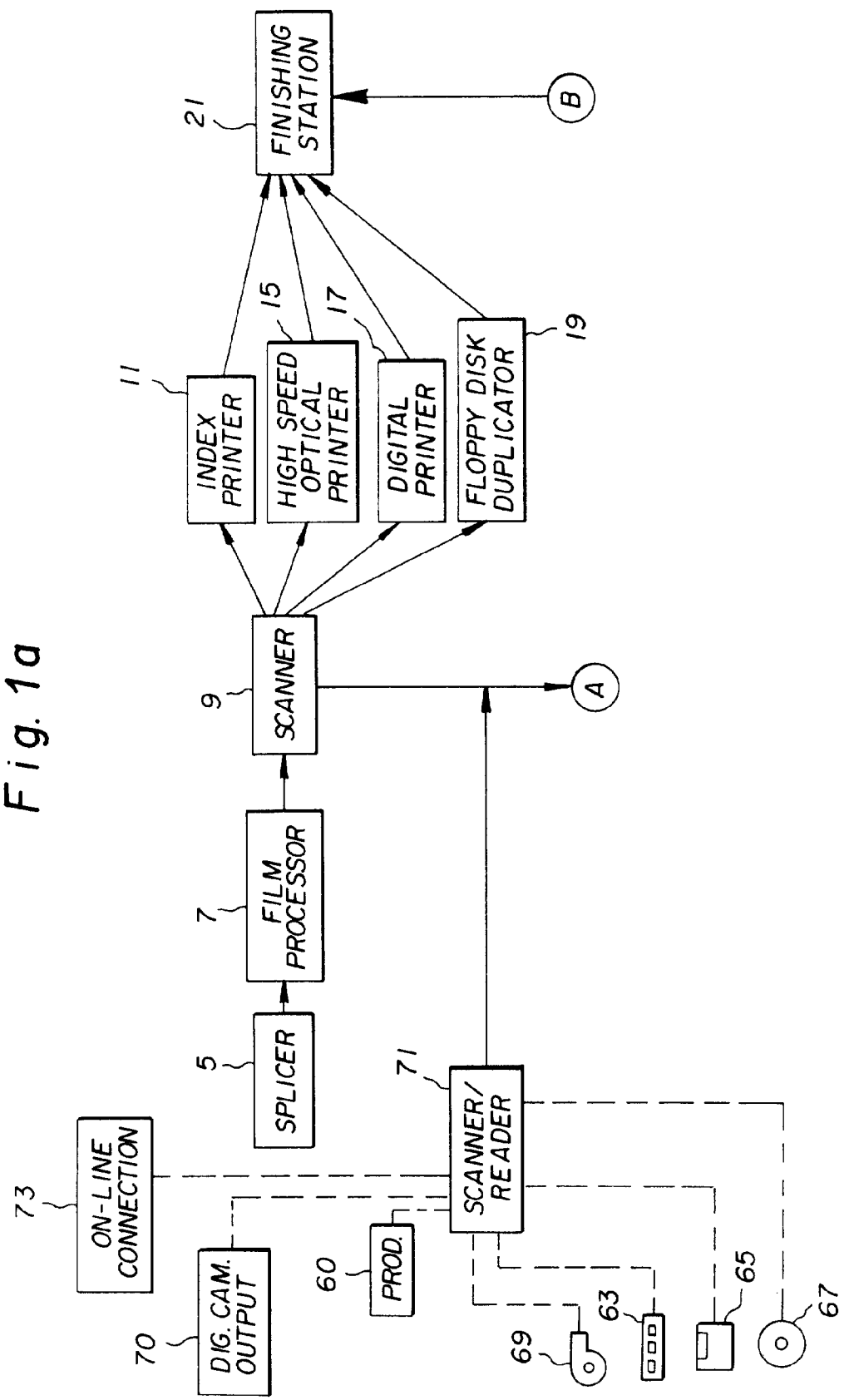

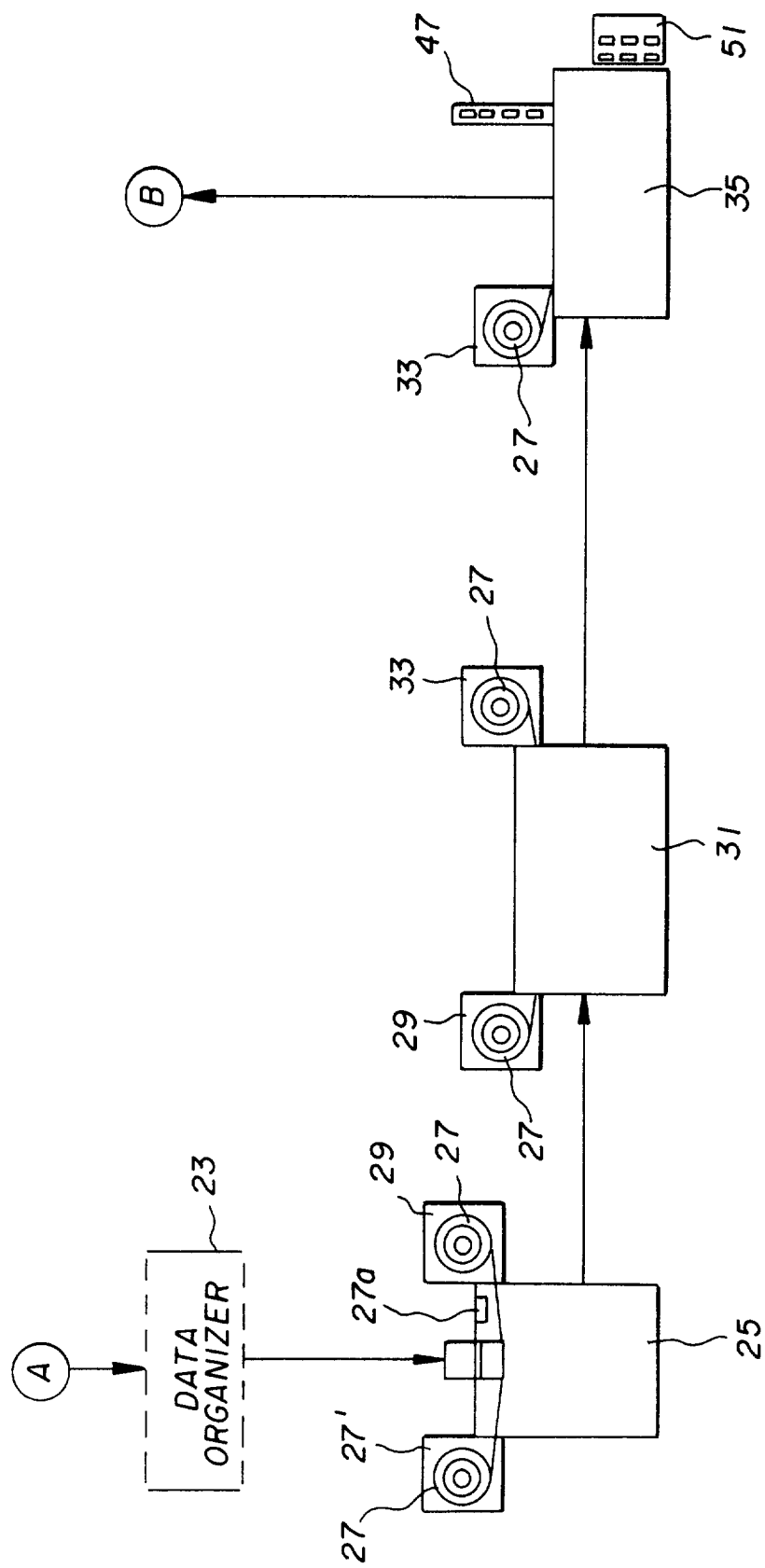

SYSTEM AND METHOD FOR TRANSFERRING IMAGES ON AN IMAGE CONTENT OF A FIRST FORMAT TO A PHOTOSENSITIVE FILM OF A SECOND FORMAT

FIELD OF THE INVENTION

The present invention relates to a system and method of transferring images on an image content of a first format to a second format, which can be, for example, a preferred film format.

BACKGROUND OF THE INVENTION

Advanced Photo System film such as IX240 provides for the return of customer negatives in an original cassette. Advanced Photo System film also includes a magnetic coating which allows information such as date, time, etc., to be stored thereon. This leads to enhanced systems for home storage and easy retrieval of images on negatives for subsequent access and further utilization. In film formats such as 35 mm or 110 film, customer negatives are normally returned to them cut into strips with no convenient way of locating particular pictures. These negatives are normally stored by being tossed into a box, kept in an envelop or simply discarded or lost. Film formats such as 35 mm and 110 film do not provide for enhanced downstream utilities (back printing, index prints, etc.) which are possible with Advanced Photo System film.

SUMMARY OF THE INVENTION

The present invention provides for a system and method which enables customers to take images on an image content of a first format such as existing negatives, an exposed roll of 35 mm film, a photographic print, a floppy disk, a compact disc, etc., to a lab and have the images on the image content of the first format reproduced in a way that provides the convenience and downstream utility of Advanced Photo System film. More specifically, the system and method of the present invention enables images on the image content of the first format to be transferred onto Advanced Photo System film, with the option of providing negative information on the Advanced Photo System film as requested. Therefore, as an example, with the system and method of the present invention, customers can have photosensitive material of a first format such as 135, 126, 110, 120 film or disc negatives reproduced on photosensitive film of a second format such as Advanced Photo System film, and returned to them in an Advanced Photo System cassette along with index prints and, if required, service prints. The returned Advanced Photo System film can also include magnetic information such as titles, date, time, etc.

The present invention provides for a system for transferring an image on an image content of a first format to a continuous web of photosensitive film of a second format which comprises an input device which captures an image content of a first format so as to obtain a digital record of images contained thereon; a digital film writer for writing images onto a continuous web of photosensitive film of a second format; and a transferring mechanism which transfers the digital record of the images contained on the image content of the first format to the digital film writer, wherein the digital film writer writes images onto the continuous web of photosensitive film of the second format in accordance with the digital record of the images contained on the image content of the first format.

The present invention also provides for a method of transferring images on an image content of a first format to a photosensitive film of a second format, with the method comprising the steps of providing a digital record of images from an image content of a first format; forwarding the digital record to a digital film writer and writing the images from the digital record onto a photosensitive film of a second format; and processing the photosensitive film of the second format having the images from the digital record thereon.

Also, storage of images such as on a floppy disk tends to be non-permanent and can easily be erased. The system and method of the present invention permits a conversion of a non-permanent storage of images to a permanent media with high storage capabilities such as film.

BRIEF DESCRIPTION OF THE DRAWINGS

FIGS. 1a and 1b are flow operational charts illustrating the system of the present invention;

FIG. 2b is an enlarged view of the cut and re-shaped film of FIG. 2a.

DETAILED DESCRIPTION OF THE INVENTION

Figure 2A:
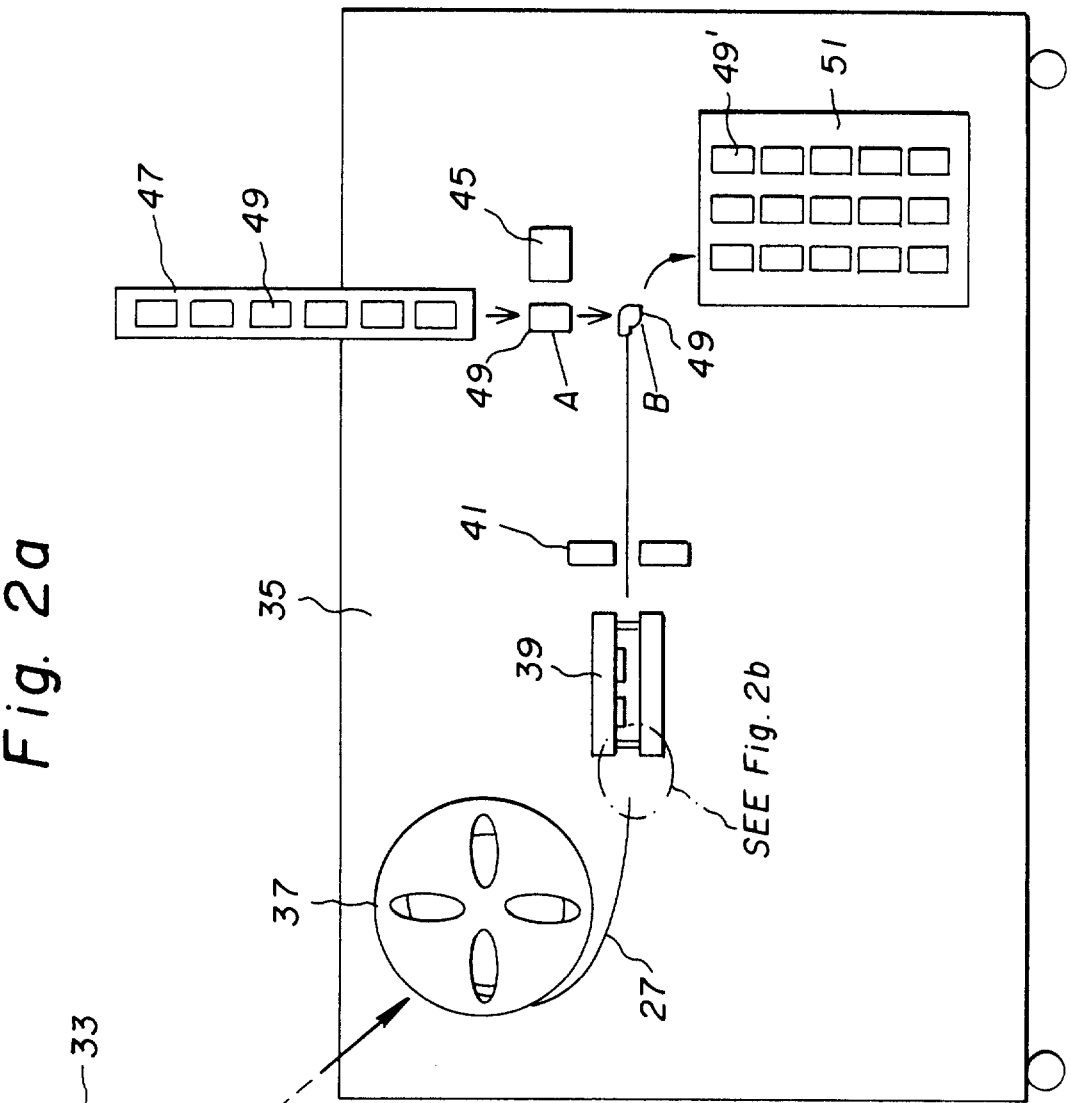
FIG. 2a is a schematic illustration of an apparatus in the system which cuts, shapes and attaches individual strips of film to a long continuous unspliced web of photosensitive film.

Referring now to the drawings, wherein like reference numerals designate identical or corresponding parts throughout the several views, FIGS. 1a and 1b illustrate an overview of the system and the sequence of the method of the present invention. With the system of the present invention, a customer can take an image or images from an image content of a first format such as a photosensitive material or more particularly, negatives from an exposed roll of 35 mm film, to a photoprocessing lab where the negatives would be spliced in a splicer 5 into a batch of film. The spliced film batch would then be processed in a film processor 7 to form optical images.

As further illustrated in FIG. 1a, after the spliced film batch is processed in film processor 7, the spliced film batch is then scanned in an input or capture device such as a scanner 9 to record the digital image information and give a digital record of optical images on the negative. Scanner 9 can be, for example, a reel to reel digital scanner.

The customer can thereafter choose to have the recorded image placed on an output media such as an index printer 11, a high speed optical printer 15, a high speed digital printer 17, a floppy disk duplicator 19, etc. The film can then be printed as required, cut into strips at a universal finishing station 21 and returned to the customer.

With the system and method of the present invention, the customer has the option of choosing to record the information from the original negative on an Advanced Photo System film such as IX240. With this option, after scanner 9, the present invention provides for the storing of the digital record scanned by scanner 9 into a digital image data organizer 23 such as a personal computer. Digital image data organizer 23 may also perform color correction or digital enhancement algorithms as required before writing the film onto the Advanced Photo System film.

As illustrated in FIG. 1b, the system includes a digital film writer 25 which can expose a continuous unspliced web of perforated Advanced Photo System film 27 provided on a supply reel or magazine 27' and record the image. The Advanced Photo System film 27 may have certain information such as film identification number, manufacturing lot, etc., recorded at the factory. During use, a user loads supply reel 27' containing photosensitive film of a second format such as Advanced Photo System film 27 onto digital film writer 25. While Advanced Photo System film 27 is conveyed through digital film writer 25, digital image data organizer 23 transfers information for a particular image scanned by scanner 9 to digital film writer 25. Digital film writer 25 writes images onto a portion of Advanced Photo System film 27 based on the information sent from digital image data organizer 23. Also, magnetic or optical information which can be customer requested information can be added onto a magnetic and/or optically sensitive layer provided on film such as Advanced Photo System film 27 through optical or magnetic recorder 27a. The exposed Advanced Photo System film 27 is then wound on a reel or magazine 29, removed from digital film writer 25 and placed onto a film processor 31. Film processor 31 processes exposed Advanced Photo System film 27 as it is conveyed through processor 31 and winds film 27 on a supply reel or magazine 33. At this point, a negative image equivalent to the original negative is present on Advanced Photo System film 27 and wound on supply reel 33.

Figure 2B:
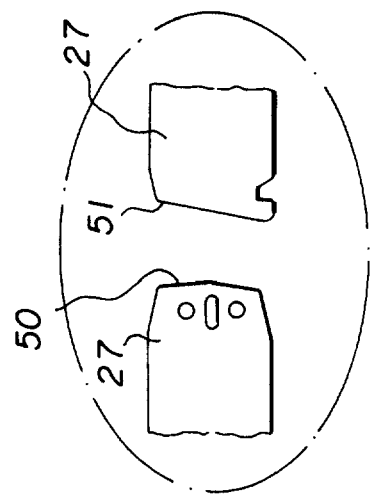

A user thereafter removes exposed Advanced Photo System film 27 on supply reel 33 from film processor 31 and places it on a shape and attach device 35. Shape and attach device 35 is seen in detail in FIG. 2a. As illustrated in FIG. 2a, supply reel 33 with digitally exposed, chemically processed, perforated continuous photographic Advanced Photo System film 27 is placed in a receiving section 37 of shape and attach device 35. Advanced Photo System film 27 on supply reel 33 is then drawn to a cutting and shaping station which includes a standard die cutter 39. Die cutter 39 cuts Advanced Photo System film 27 into individual film strips with the appropriate leader 50 and trailer 51 shaped as illustrated in FIG. 2b.

After Advanced Photo System film 27 on supply reel 33 is cut and shaped by die cutter 39, film 27 can be transferred to a film reading section having a film reader 41. Film reader 41 can be a magnetic or an optical film reader which can read information from recorder 27a or information written at the factory. At the film reading section, film reader 41 reads information such as a film identification number written at the factory on Advanced Photo System film 27. Thereafter, a label can be printed at a label printing station which includes a label printer 45. Label printer 45 can receive and print information such as a bar code, human readable information, etc. read by film reader 41 for a particular film strip.

Shape and attach device 35 further includes an empty film cassette supply station comprising a supply tube 47 which supplies empty film cassettes 49 which can be known thrust-type film cassettes in a direction towards label printer 45. Empty film cassette 49 is supplied by supply tube 47 to a position A where a label can be permanently applied to film cassette 49. Film cassette 49 with the label thereon can then be maneuvered into a position B where Advanced Photo System film 27 which has been cut and shaped and matches the printed identification number can be attached to the spool of the film cassette 49. In cutting and shaping Advanced Photo System film 27, the length of Advanced Photo System film 27 (exposure length) should match the capacity of cassette 49. Film cassette 49 is adjusted to reflect the processed film contained in the cassette, and a newly created film cassette 49' can then be placed in a film cassette magazine 51. The newly created film cassette 49' can then be transferred to universal finishing station 21 where cassette 49' can be matched with a customer order, packaged and returned to the customer.

The above is just one example of the implementation of the present invention and it is noted that the present invention is not limited to the transferring of images from photosensitive material of an exposed roll of, for example, 35 mm film to an Advanced Photo System film. For example, as illustrated in FIG. 1a, the image content of the first format on which an image or images are located can be in the form of photographic prints 60, 135 negative cut strips 63, a floppy disk 65 having images thereon, a compact disc 67 having images thereon or even an Advanced Photo System film cassette 69 which is desired to be duplicated. As illustrated in FIGS. 1a and 1b, if the image content of the first format is in the form of any of products 60, 63, 65, 67 and 69 as described above, a customer can deliver any of products 60, 63, 65, 67 and 69 to a reorder station which can be an input or capture device such as a scanner/reader 71. The scanner/reader 71 can scan or read the images on any of the products 60, 63, 65, 67 and 69 and provide a digital record of these images. The digital record scanned by scanner/reader 71 is then delivered and stored in digital image data organizer 23. After this point, the process would follow the same path as described above with respect to the transfer of images from a 35 mm film and illustrated in FIGS. 1b, 2a and 2b.

As a further feature of the present invention, the image content of the first format on which an image or images are located can be in the form of a digital camera output 70 of a digital camera or an on-line connection 73 such as the internet. In the case of digital camera output 70, this can be in the form of a memory card or a direct wire connection to scanner/reader 71. In this instance scanner/reader 71 would act as a reader to read and transfer the image or images to digital image data organizer 23. On-line connection 73 permits a user to feed images directly from their home or personal computer on-line to scanner/reader 71 which reads and transfers the images to digital image data organizer 23. As noted above, after this point the process would follow the same path as described above and illustrated in FIGS. 1b, 2a and 2b.

Therefore, the present invention provides for an arrangement in which a customer can transfer images on an image content of a first format such as existing negatives, an exposed roll of 35 mm film, a print, a floppy disk or a compact disc onto Advanced Photo System format film, and thus take advantage of the features that are available with Advanced Photo System film. The arrangement of the present invention also permits a user to convert a non-permanent storage of images to a permanent media such as Advanced Photo System film which has high storage capabilities.

The invention has been described in detail with particular reference to certain preferred embodiments thereof, but it will be understood that variations and modifications can be effected within the spirit and scope of the invention.

What is claimed is:

1. A system for transferring an image on an image content of a first format to a continuous web of photosensitive film of a second format, the system comprising:

an input device which captures an image content of a first format so as to obtain a digital record of images contained thereon;

a digital film writer for writing images onto a continuous web of photosensitive film of a second format;

a transferring mechanism which transfers said digital record of the images contained on the image content of the first format to said digital film writer, wherein said digital film writer writes images onto said continuous web of photosensitive film of said second format in accordance with said digital record of the images contained on the image content of the first format; and a cutting, shaping and attaching assembly which cuts and shapes said continuous web of photosensitive film of said second format having said written images thereon after it has been processed, and attaches said photosensitive film of said second format to a thrust film cartridge.

2. A system according to claim 1, further comprising a processor which processes the continuous web of photosensitive film of said second format after said images have been written on said web by said digital writer.

3. A system according to claim 1, wherein said continuous web of photosensitive material of said second format contains a magnetic layer for recording information.

4. A system according to claim 1, further comprising a magnetic writer for writing information onto said magnetic layer.

5. A system according to claim 1, wherein said image content of the first format is a photosensitive material.

6. A system according to claim 1, wherein said image content of the first format is a negative cut strip.

7. A system according to claim 1, wherein said image content of the first format is a photographic print.

8. A system according to claim 1, wherein said image content of the first format is a floppy disk.

9. A system according to claim 1, wherein said image content of the first format is a compact disc.

10. A system according to claim 1, wherein said image content of the first format is a digital camera output.

11. A system according to claim 1, wherein said image content of the first format is an on-line connection.

12. A system according to claim 1, wherein said input device is a scanner.

13. A system according to claim 1, wherein said input device is a reader.

14. A method for transferring an image on an image content of a first format to a photosensitive film of a second format, the method comprising the steps of:

providing a digital record of images from an image content of a first format;

forwarding said digital record to a digital film writer and writing the images from said digital record onto a photosensitive film of a second format;

processing said photosensitive film of said second format having the images from said digital record thereon; and cutting said photosensitive film of said second format into strips of predetermined lengths;

shaping at least one end of said strips for attachment to a spool of a thrust film cartridge; and attaching said at least one shaped end of said strip to the thrust film cartridge.

15. A method according to claim 14, wherein said photosensitive film of said second format is provided with a magnetic layer for recording of information thereon, the method further comprising the step of:

recording information onto said magnetic layer of said photosensitive film of said second format.

16. A method according to claim 14, wherein said photosensitive film of said second format is provided with an optically sensitive layer for recording of information thereon, the method further comprising the step of:

optically recording information onto said optically sensitive layer of said photosensitive film of said second format.

17. A method according to claim 15, wherein said information includes customer requested information.

18. A method according to claim 15, wherein said information is written onto said magnetic layer by said digital film writer.

19. A method according to claim 16, further comprising the step of using said information so as to provide identification information on said thrust cartridge.

* * * * *